Jan. 4, 1966 W. M. STELTER 3,227,534
FUEL-AIR-MIXTURE STRUCTURE FOR INTERNAL COMBUSTION ENGINES
Filed Sept. 14, 1964
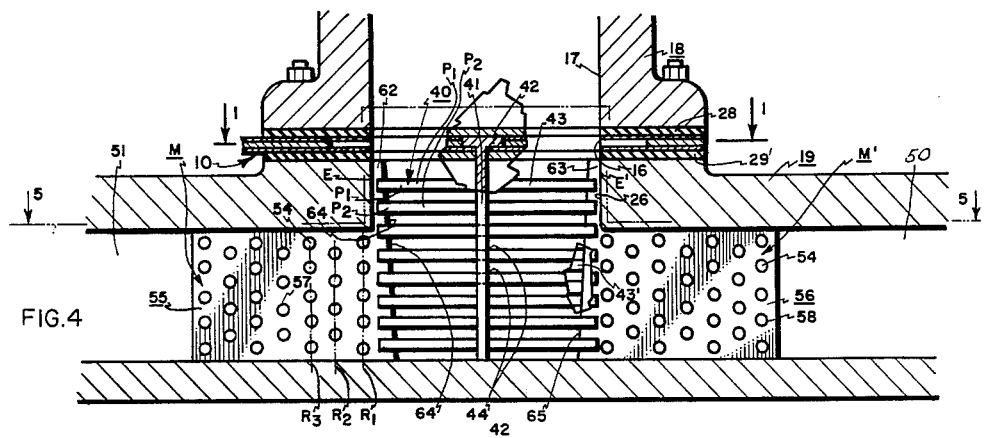
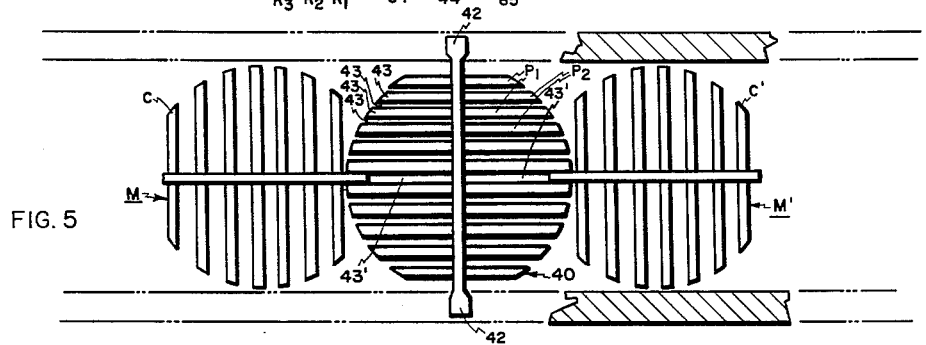
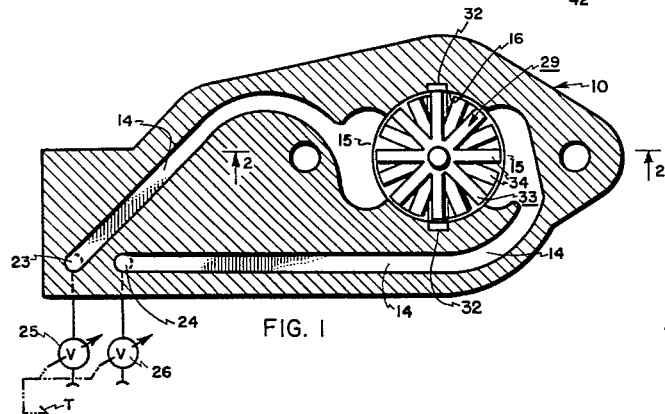
INVENTOR
WILLIAM M. STELTER
BY M. Ralph Shaffer
HIS ATTORNEY

# United States Patent Office 3,227,534
Patented Jan. 4, 1966

3,227,534
FUEL-AIR-MIXTURE STRUCTURE FOR INTERNAL COMBUSTION ENGINES
William M. Stelter, 1772 East 70th South, Salt Lake City, Utah
Filed Sept. 14, 1964, Ser. No. 396,238
2 Claims. (Cl. 48—180)

This is a continuation-in-part of my United States patent, No. 3,168,085, entitled Carburetion Optimization Structure.

The present invention relates to internal combustion engines and, more particularly, to improved structural means, designed for insertion between the carburetor and the combustion chambers of the engine, whereby carburetion of the fuel-air mixture is optimized, i.e. where atomization and vaporization of the fuel-air and raw gas mixture coming from the carburetor is increased, this to increase the efficiency of combustion in the engine.

Accordingly, the principal object of the present invention is to provide an improved structural means for insertion within the fuel-air path leading from the carburetor to the combustion cylinders of the engine so as to increase carburetion and engine efficiency.

An additional object is to provide a fuel-air deflection mixer structure which determines fuel-air flow along a multiplicity of circuitous paths, this to provide for increased effective bombardment of raw gas droplets entrained in the fuel-air stream and also increase the homogeneity of the composite fuel-air mixture, so that a substantially completely vaporized and homogenous fuel-air mixture enters the combustion cylinders of the engine, and this even when principle of auxiliary air introduction is utilized.

An additional object is to provide fuel-air mixture structures for convenient placement within the intake manifold entrance bore and the laterals thereof so that definite depths or volumes thereof are occupied by the respective mixer structure, and this in a manner such that mixer structure reduces restriction of the laterals and the main bore to a minimum and yet provides the maximum of circuitous paths therethrough, this for assuring the greatest possible homogeneity and vaporization of fuel in the fuel-air mixture drawn into the combustion cylinder.

An additional object is to provide for accommodation within an auxiliary air plate, disposed between the carburetor and intake manifold, of a conveniently mounted fuel-air mixer coacting with the air plate and with the carburetor to achieve a maximum of homogenizing of the fuel-air and raw gas mixture.

An additional object is to provide staggered air-flow deformative finger arrangements in mixer constructions for internal combustion engines wherein a maximum of mixing of the fuel-air mixture and raw gas therein is attained without appreciably reducing the flow volume.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a horizontal section taken on the line 1—1 in FIGURE 4, illustrating the air passageway plate utilized in the present invention both in the embodiment in FIGURES 1-3 and also that of FIGURES 4 and 5.

FIGURE 2 is a somewhat enlarged vertical section, taken along the line 2—2 in FIGURE 1.

FIGURE 3 is an enlarged vertical section taken on the line 3—3 in FIGURE 2.

FIGURE 4 is an enlarged, vertical, fragmentary section of a portion of inter-cooperating carburetor and intake manifold structures, the same being secured together through an auxiliary air passage plate, this with mixers of the present invention being mounted in the laterals and main bore of the intake manifold.

In FIGURE 1 air passage plate 10 is preferably formed in a sandwich construction having backing plates 11 and 12 and a filler plate 13, see FIGURE 2. The filler plate 13 is provided with plural air passageways 14, which may be milled or acid-etched, and which communicate at their respective enlarged extremities 15 with bore 16, the latter being designed for registry with bores 17 and 26 of the carburetor 18 and manifold 19, respectively, of the internal combustion engine. Studs 20 and nuts 21 provide for securement of the mounting flange 22 of the carburetor to the intake manifold 19. Passageways 23 and 24 communicate with valving means 25 and 26 which are controlled by suitable coupling to the throttle T of the vehicle. The valves may be ganged together for mutual progressive opening as shown and as fully described in the applicant's copending application, Serial No. 290,830, filed June 26, 1963, now U.S. Patent No. 3,168,085, and entitled "Carburetion Optimization Structure." These valves, of course, can be independently regulated and/or independently adjusted. All of this is disclosed in the referenced patent application by the inventor.

In any event, it is to be noted that the bores 17, 16, and 26 of the carburetor, air passageway, and intake manifold, respectively, are in registry, and the structure is secured together by means of attachments 20 and 21 and gaskets 28 and 29'.

The present invention under consideration is the insertion, in depth, of certain fuel-air deflection mixture structure. This mixer structure, hereinafter referred to as "mixer," is designated as 29 in FIGURES 1 through 3 and represents a first embodiment of the invention, and is fully described in the applicant's above-referenced patent application; certain other structure as contained in a second embodiment of the invention is shown in FIGURES 4 and 5, and will be more fully described hereinafter.

In connection with the embodiment shown in 1-3 the fuel-air deflection mixture structure 29 includes a U-configured mounting strap 30 having outwardly-directed extremities 31 which seat into recessed shoulders 32 of the air passage plate 10.

Mounted upon the mounting strap 30 are plural spiders 33 which are mutually displaced with respect to each other and each of which includes outwardly-directed fuel-air deflection fingers 34. In the embodiment shown in FIGURES 1-3 these fuel-air deflection finger elements are radially directed outwardly. Where the fingers are mutually displaced with respect to each other and where the individual spiders themselves are spaced apart as indicated by spacers 38 and 39, for example, see FIGURE 3, the mixture structure 33 then occupies a volume of space wherein direct communication in a straight line from above the mixture to areas beneath the mixture is reduced to a minimum; yet, the volume of the fuel-air mixture which can be accommodated is only diminished very slightly, i.e. by the total finger area of a respective spider. The spiders should be spaced apart sufficiently so that flow of the fuel-air mixture is at no point diminished beyond that reduction necessitated by the existence of the fingers of a single particular spider. Obviously, in this case the spiders will not be disposed contiguously with respect to each other. Rather, the spacing S between them should be sufficient so that the mutual displacement of the spiders as concerns the respective fingers, see FIGURE 1, will not diminish fuel-air flow through this mixer volume; ratios of proper spider spacing to fingers' area of course, depends on the number of fingers present, the width of the respective fingers, and so on. The mixture structure, again, and with reference to the operation thereof, merely serves to provide a multiplicity of the circuitous, tortuous paths for the fuel-air mixture through this portion of the intake of the engine without appreciably diminishing the volume of fuel-air flow other than by the cross-sectional area of the fingers of a single spider.

In the embodiment shown in FIGURES 4 and 5 fuel-air deflection mixture structure 40 includes a depending support plate 41 having outwardly extending ears 42 which fit into shouldered recesses 32 of the air passageway as indicated in connection with the embodiment shown in FIGURES 1-3. Depending support plate 41 includes a multiplicity of rods or fingers 43, i.e. fuel-air deflection elements, which in fact may be silver soldered or otherwise secured to the depending support plate 41 by the former being positioned through respective finger apertures 44 of the support plate and pushed half-way therethrough. The fingers 43, hence, serve as deflection fingers or deflection rods to distort the fuel-air flow as the same proceeds therethrough from the carburetor 18 into the intake manifold 19. FIGURE 5 indicates the several fingers or rods 43 are staggered, i.e., that the fingers of successive planes $P_1$ and $P_2$, et cetera, are staggered so that there are substantially no direct straight paths for fuel-air flow through the volume occupied by the mixture. Various staggered patterns can be used, such as that shown in connection with the manifold lateral mixers M and M'. Through experimentation it has been found sufficient simply that every other plane $P_1$ and $P_2$ of the deflection finger multiplicities 43 be staggered, with every other one being in line as to finger registry. Of course, rather than the double-plane staggering there could be a triple-plane staggering or more, and this in fact would increase the ratio of efficiency-in-mixing to reduction-in-volume because of the space occupied by the fingers at each plane $P_1$ and $P_2$.

FIGURES 4 and 5 also illustrate the mixer structures M and M' which are inserted into the laterals 50 and 51 of the intake manifold. These again occupy a definite volume, and the planes $R_1$, $R_2$, $R_3$ of the several fingers 54 are mutually spaced, as also is the case of mixer M', so that volume of flow is not reduced by there being more than one plane of deflection fingers in the structure. Again, plates 55 and 56 of the laterals' mixers are provided with respective apertures 57 and 58 for receiving the respective rods 54 thereof. The rods are spaced in rows or planes and in the embodiment shown are staggered plane to plane ($R_1$, $R_2$, $R_3$) so that the desired mixing effect can be obtained. Again, straight line paths for the fuel-air mixture are reduced to a minimum or completely diminished, this without reducing or constricting volume flow of the vent through the very small cross-sectional areas of the fingers of a respective plane.

It is seen that plates 55 and 56 include upstanding positioning portions 62 and 63 and also are provided with edges 64 and 65. These upstanding position portions 62 and 63 contact the bore surface of the manifold so as to preclude these mixers M and M' from being blown outwardly into the laterals. Additionally, the edges 64 and 65 may be designed to contact vertical row of rods, pins, or fingers 43' which are slightly shortened as at 43'. Hence, such fingers 43', in addition to serving the air deflection function, will deter the mixtures M and M' from appreciable movements within the manifold structure. Thus, they act as limit-stops or positioning means for the respective mixer plates 55 and 56.

For convenience of illustration, it is preferable that the edges 64 and 65 be inwardly tapered downwardly so as to provide for easy insertion.

The general cylindrical configuration C and C' of the lateral's mixing structures M and M' are for the purpose of enabling easy insertion of the mixture structures downwardly through the central bore 26 of the manifold prior to their being positioned outwardly in the manifold such that surfaces E and E' of upstanding portions 62 and 63 are made to contact the manifold 19.

In operation the mixers M and M' both serve in much the same manner as that indicated in FIGURES 1-3. Thus, a definite volume is occupied by the mixing structure and the fingers; planes are preferably spaced no closer together than to optimize fuel mixing in this volume. Thus, the fuel-air flow is constricted no more than the transverse cross-sectional area of the fingers of a particular, deflection finger plane $R_1$, $R_2$, $R_3$. The particular dimension between planes $R_1$, $R_2$, and $R_3$ will vary from occasion to occasion since the number of pins may vary, the particular staggering pattern, and so forth. However, for proper mixing and minimizing of the constriction of both the principal bore of the manifold and of the laterals' bores, it is desirable that the spacing between finger planes $R_1$–$R_3$ be no greater than that necessary to maintain volume flow minus the longitudinal, vertical, cross-sectional areas' summation of the fingers in the particular vertical plane $R_1$, $R_2$, $R_3$.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. For disposition in the intake manifold of an internal combustion engine, said intake manifold including an intake opening and oppositely extending lateral passageway means communicating with said intake opening: mixer structure including first and second mixer means each comprising a support plate and a plurality of fuel-air deflection elements secured to said support plate, each of said support plates including outwardly extending positioning portions for retentive engagement with said intake manifold proximate said intake opening, the remaining portion of each of said support plates with their respective deflection elements being respectively disposed within a respective one of said lateral passageway means, and a third mixer means operatively disposed within said intake opening and engagingly extending between and backing said first and second mixer means, said third mixer means including support means and deflection means mounted thereto.

2. Structure according to claim 1 wherein said intake opening is cylindrically configured, and said first and second mixer means being cylindrically configured and constructed to permit insertion thereof through said intake opening and subsequent positioning within a respective one of said lateral passageway means, said third mixer being likewise cylindrically configured and constructed for backing engagement with said first and second mixer means when the latter are in position within their respective lateral passageway means.

References Cited by the Examiner

UNITED STATES PATENTS

| 1,130,278 | 3/1915 | Hatfield | 48—180 |
| 1,131,371 | 3/1915 | Hatfield | 48—180 |
| 1,344,303 | 6/1920 | Little. | |
| 1,448,828 | 3/1923 | Chace | 48—180 |
| 1,449,101 | 3/1923 | Harper | 48—180 |
| 1,519,665 | 12/1924 | Charles | 48—180 |
| 1,753,009 | 4/1930 | Hess | 48—180 |
| 1,885,559 | 11/1932 | Smith | 48—180 |
| 2,022,510 | 11/1935 | Hutchison | 48—180 |
| 2,146,246 | 2/1939 | Barnes | 48—180 |
| 2,409,937 | 10/1946 | Hutchinson | 48—180 |
| 3,168,085 | 2/1965 | Stelter | 48—180 X |

FOREIGN PATENTS

| 256,829 | 8/1926 | Great Britain. |

MORRIS O. WOLK, *Primary Examiner.*

JOSEPH SCOVRONEK, *Assistant Examiner.*